(12) United States Patent
Wang et al.

(10) Patent No.: US 6,336,645 B1
(45) Date of Patent: Jan. 8, 2002

(54) CLAMPING CUSHIONING MECHANISM FOR A SKATEBOARD

(76) Inventors: Leao Wang; Peter Wu, both of No. 1, Lane 233, Sec. 2, Charng Long Rd., Taiping 411 (TW)

(*) Notice: Subject to any disclaimer, the term of this patent is extended or adjusted under 35 U.S.C. 154(b) by 0 days.

(21) Appl. No.: 09/596,688

(22) Filed: Jun. 19, 2000

(51) Int. Cl.[7] .................................................. B62M 1/00
(52) U.S. Cl. ................................. 280/87.041; 280/87.05
(58) Field of Search .......................... 280/87.041, 87.05, 280/87.042, 87.03, 87.01, 47.22, 124.125, 124.177

(56) References Cited

U.S. PATENT DOCUMENTS

| | | | | |
|---|---|---|---|---|
| 889,489 | A | * 6/1908 | Snediker | 280/87.042 |
| 1,070,468 | A | * 8/1913 | Henley | 280/87.042 |
| 1,387,091 | A | * 8/1921 | Woolley et al. | 280/87.042 |
| 4,951,958 | A | * 8/1990 | Chao | 280/87.041 |
| 5,330,214 | A | * 7/1994 | Brooks et al. | 280/87.042 |
| 5,551,717 | A | * 9/1996 | De Courcey Milne | 280/87.042 |
| 5,868,408 | A | * 2/1999 | Miller | 280/87.042 |
| 5,997,018 | A | * 12/1999 | Lee | 280/87.042 |
| 6,142,493 | A | * 11/2000 | Wang et al. | 280/87.041 |
| 6,206,388 | B1 | * 3/2001 | Ouboter | 280/87.042 |

* cited by examiner

*Primary Examiner*—J. J. Swann
*Assistant Examiner*—James S. McClellan
(74) *Attorney, Agent, or Firm*—Dougherty & Troxell; Kuo-Hsiung Chiu

(57) ABSTRACT

The present invention relates to a cushioning mechanism for a skateboard disposed between a turning shaft under the main body of the skateboard and the wheel assemblies or a supporting element. The clamping cushioning mechanism includes two claw-shaped elements corresponding in form at two sides thereof respectively. The claw-shaped elements have a pivoting hole respectively at the bottom end thereof which are used for connecting with the pivoting member of each wheel assembly. The claw-shaped elements include a clamping face at the top thereof in order to create a receiving space between the clamping face and cross shafts of the respective wheel assembly for fastening a cushion pad. Consequently, when the user stands on the skateboard which is then loaded and pressed downwards, this stress will be transmitted by the transmission axle to the clamping cushioning mechanism. At this time, the clamping faces of the claw-shaped elements will be pressed downwards due to the loading force while an upward reactive force is produced because the wheel assembly is in contact with the ground. Accordingly, the clamping faces and cross shafts clamp themselves in the opposite direction, and an excellent cushioning effect is obtained.

1 Claim, 2 Drawing Sheets

CLAMPING CUSHIONING MECHANISM FOR A SKATEBOARD

BACKGROUND OF THE INVENTION

1. Field of the Invention

The present invention relates to a clamping cushioning mechanism for a skateboard, and more particularly, to an improvement with a quiet and stable cushioning effect.

2. Description of the Prior Art

A great force is applied to the main body of all kinds of exercise apparatuses (e.g. treadmill, jogging machine, skateboard, etc.) when the user uses it. Therefore, in order to protect the main body from shaking due to the applied force, a cushioning member is generally mounted at a proper position for reducing the shaking effect.

However, a spring or a soft pad is directly installed between the supporting member and the ground. In a word, the spring or the soft pad is directly pressed by the stress transmitted by a supporting element to create a deformation thereof and then to achieve a cushioning effect. When the above-mentioned external force disappears, it restores itself by means of the resilient force. This kind of the conventional cushioning mechanism has been used for many years without any serious disadvantages. However, when the spring or the soft pad restores itself, a reactive force will be created upon the supporting member. Consequently, the user must feel a little shaking. Regretfully, the user or the manufacturer takes it for granted.

In addition, the telescopic effect of the spring will easily produce an unpleasant rubbing noise, and the user or the manufacturer uses lubricant to solve this trouble temporarily in a passive manner. Moreover, the soft pad easily deforms due to the directly forced way, and it should be replaced regularly or irregularly.

SUMMARY OF THE INVENTION

It is a primary object of the present invention to provide a clamping cushioning mechanism for a skateboard which can remove the above-mentioned disadvantages without influence upon the original functions and is able to remove the reactive force smoothly in order to enhance the using comfort of the exercise apparatus.

BRIEF DESCRIPTION OF THE DRAWINGS

The accomplishment of this and other objects of the invention will become apparent from the following description and its accompanying drawing of which.

DETAILED DESCRIPTION OF THE PREFERRED EMBODIMENT

Figure 1:
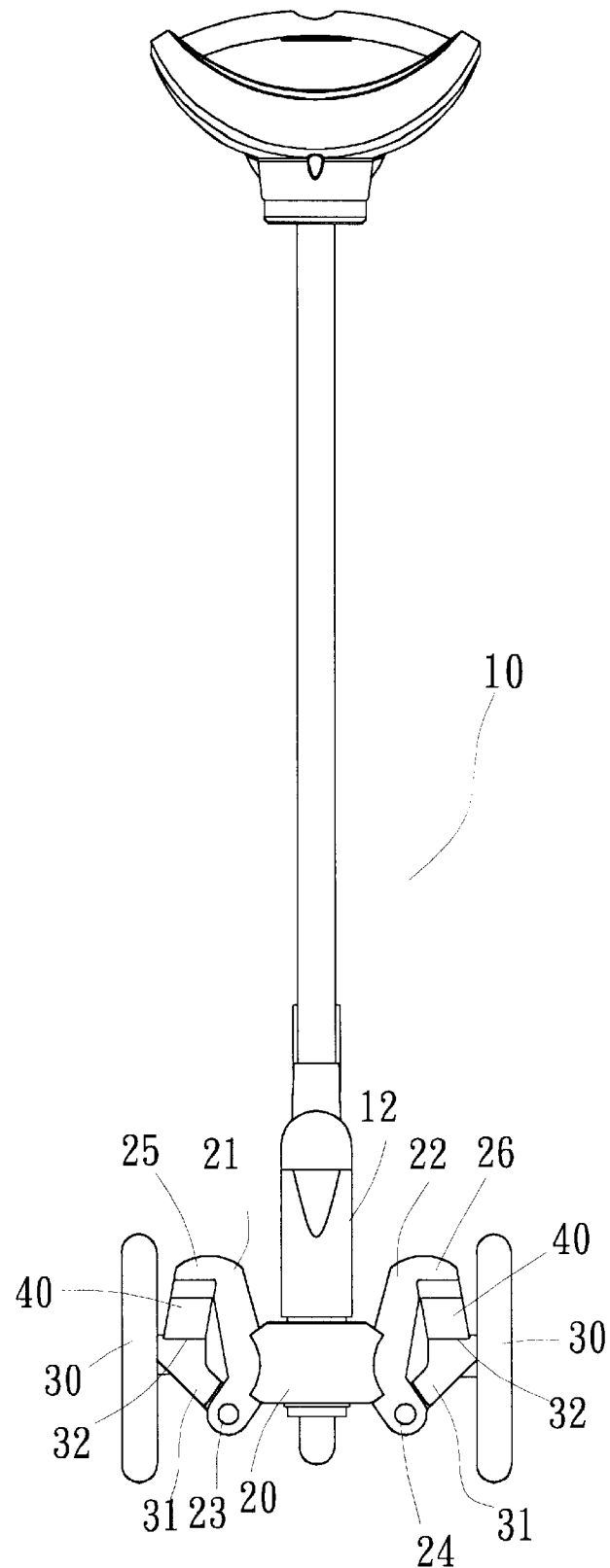
FIG. 1 is a preferred embodiment of the present invention applied to a skateboard.
Figure 2:
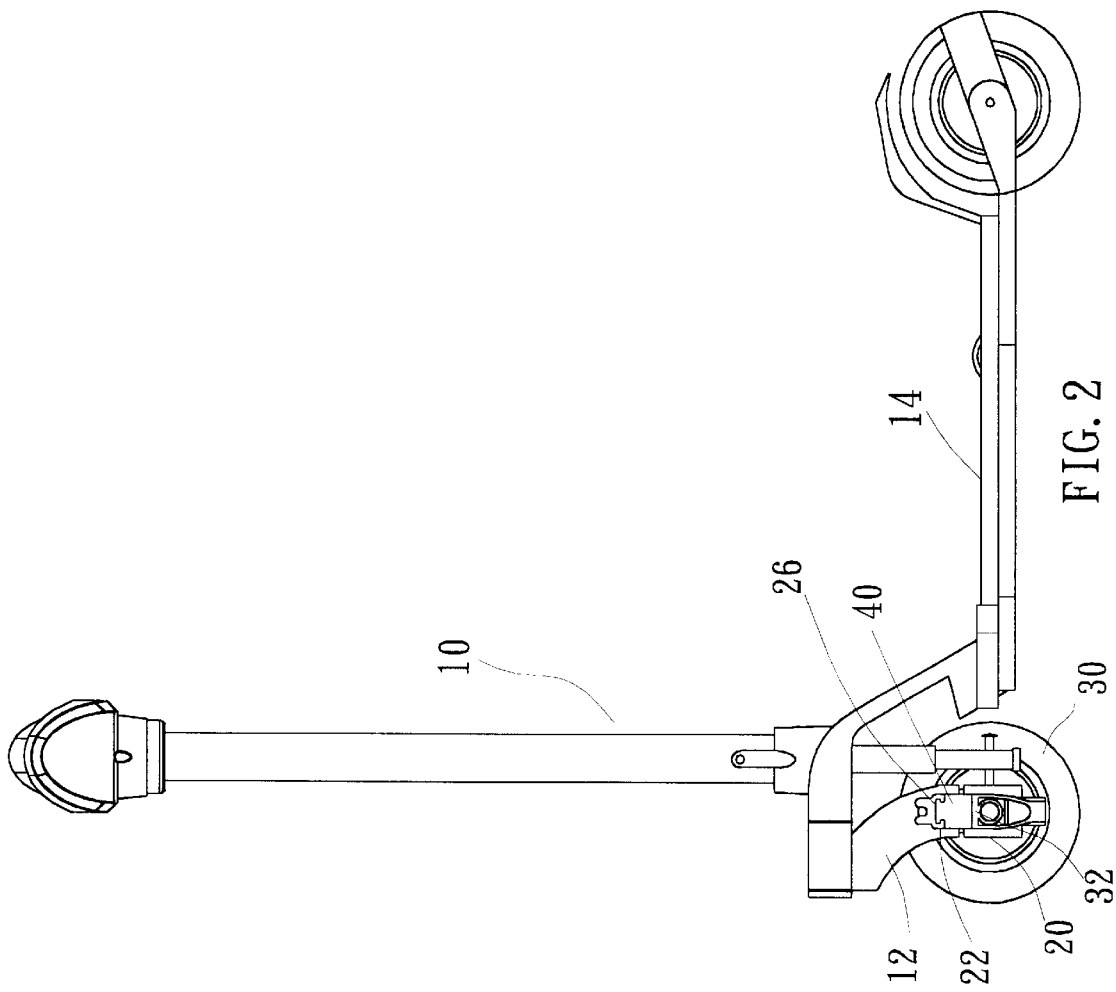
FIG. 2 is a side view of the preferred embodiment of FIG. 1.

First of all, referring to FIGS. 1 and 2, they show a preferred embodiment of the present invention applied to a skateboard 10. From the drawings, it's apparent that a clamping cushioning mechanism 20 is coupled with a transmission axle 12 under the front end of the skateboard 10.

The clamping cushioning mechanism 20 includes two claw-shaped elements 21, 22 corresponding in form at two sides thereof respectively. The claw-shaped elements 21, 22 have a pivoting hole 23, 24 respectively at the bottom end thereof which are used for connecting with the pivoting member 31 of each wheel assembly 30. The claw-shaped elements 21, 22 include a clamping face 25, 26 respectively at the top thereof in order to create a receiving space between the clamping faces 25, 26 and cross shafts 32 of the respective wheel assembly 30 for fastening a cushion pad 40. Consequently, when the user stands on deck 14 of the skateboard 10 which is then loaded and pressed downward, this stress will be transmitted by the transmission axle 12 to the clamping cushioning mechanism 20. At this time, the clamping faces 25, 26 of the claw-shaped elements 21, 22 will be pressed downwards due to the loading force while an upward reactive force is produced because the wheel assembly 30 is in contact with the ground. Accordingly, the clamping faces 25, 26 and cross shafts 32 clamp themselves in the opposite direction, and an excellent cushioning effect is obtained.

Furthermore, referring to FIG. 2, when the claw-shaped elements 21, 22 of the clamping cushioning mechanism 20 restore themselves after the external force disappears, the pivoting holes 23, 24 at the bottom thereof will be displaced in the loading direction while the wheel assembly 30 will also be turned in the corresponding direction. Accordingly, the reactive force in loading the skateboard can be effectively removed so that the reactive force transmitted back to the skateboard 10 can be minimized.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A skateboard having a clamping cushioning mechanism and comprising:

a) a deck having a rear wheel and a front portion;

b) a transmission axle connected to and located beneath the front portion of the deck;

c) a clamping cushioning mechanism on the transmission axle, the clamping cushioning mechanism comprising:

i) first and second claw elements mounted on opposite sides of the transmission axle, each claw element having an upper portion with a downwardly facing clamping surface, and a lower portion with a pivot hole;

ii) a pivoting member pivotally attached to each claw element at the pivot hole and having an upper surface facing the clamping surface of the associated claw member; and, iii) cushion pads engaging the downwardly facing clamping surfaces and the upper surfaces; and, d) a wheel rotatably attached to each pivoting member above the associated pivot hole and between the pivot hole and the downwardly facing clamping surface of the associated claw element.

* * * * *